May 23, 1933.

M. M. DOLMAGE 1,910,151

NEGATIVE ANTIRESONANT CIRCUITS

Filed Nov. 7, 1930

3 Sheets-Sheet 1

INVENTOR.

May 23, 1933.    M. M. DOLMAGE    1,910,151
NEGATIVE ANTIRESONANT CIRCUITS
Filed Nov. 7, 1930    3 Sheets-Sheet 2

INVENTOR.

Patented May 23, 1933

1,910,151

UNITED STATES PATENT OFFICE

MIHRAN M. DOLMAGE, OF WASHINGTON, DISTRICT OF COLUMBIA

NEGATIVE ANTIRESONANT CIRCUITS

Application filed November 7, 1930. Serial No. 494,084.

Figure 1:
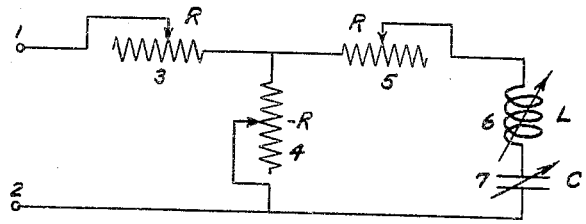

This invention relates to a new combination in the electrical art, a negative anti-resonant circuit. An anti-resonant circuit consists essentially, as well known, of a capacity and an inductance in parallel relation to each other, as shown on Fig. 2 of the drawings. The reactance frequency variation characteristics of such a circuit are shown on Fig. 3 of the drawings in dotted line, and the corresponding characteristics of the electrical network which is the subject of the present invention are shown in full line on the same Fig. 3 of the drawings. As will be readily seen the characteristics of the electrical network, first described by me in the present specification, are the exact opposite of those of an anti-resonant circuit for the same frequency. In the frequency range where an anti-resonant circuit develops a positive reactance, the network described hereunder has a negative reactance; and in the frequency range where an anti-resonant circuit develops a negative reactance, the electrical network reactance described hereunder develops a positive reactance. It should also be clearly understood that the electrical network disclosed hereunder does not develop merely a reactance of opposite sign; the numerical relationship between the reactance, at any frequency, of the electrical network of Fig. 1 of the drawings and the corresponding reactance, at the same frequency, of the anti-resonant circuit is always equal to ($-1$). This is a fundamental feature of the invention as herein disclosed. To put this in simpler language, if the anti-resonant circuit (having elements $L_1$ and $C_1$ as shown on Fig. 2) has a positive reactance of +10,000 ohms at a frequency of 1,000 cycles, the electrical network of Fig. 1 of the drawings which is its electrical negative counterpart develops a negative reactance of $-10,000$ ohms. At some other frequency, such as 3,000 cycles, if the anti-resonant circuits develops a negative reactance of $-10,000$ ohms, the circuit shown on Fig. 1 of the drawings, the electrical counterpart of the circuit of Fig. 2 of the drawings, has a positive reactance of +10,000 ohms. To summarize the above I reproduce the following table:

|  | Anti-resonant circuit | New circuit Fig. 1 of the drawings |
| --- | --- | --- |
| Cycles | Ohms | Ohms |
| 1000 | +10000 | $-10000$ |
| 3000 | $-10000$ | +10000 |

It should also be clearly understood, and this point will be demonstrated hereunder, that the unity numerical relationship between the opposite reactances, holds true at all frequencies.

Figure 2:
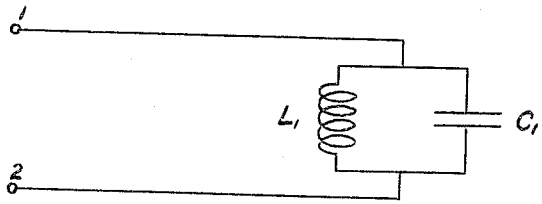
Figure 3:
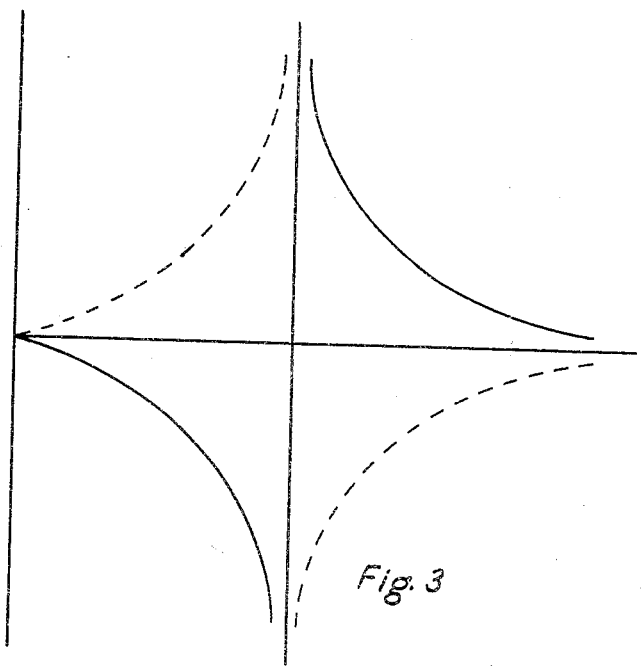
Figure 4:
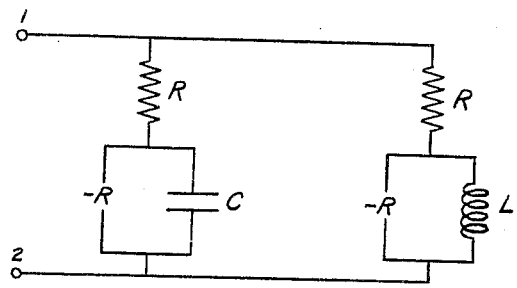
Figure 5:
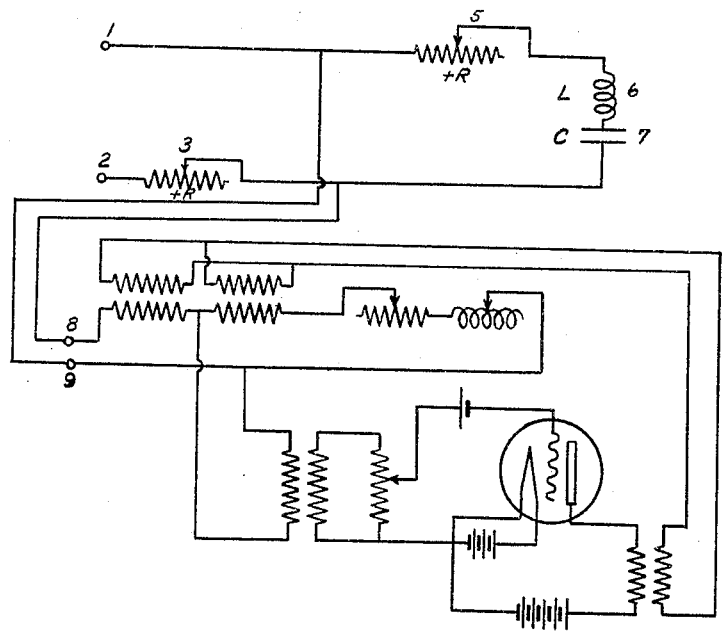
Figure 6:
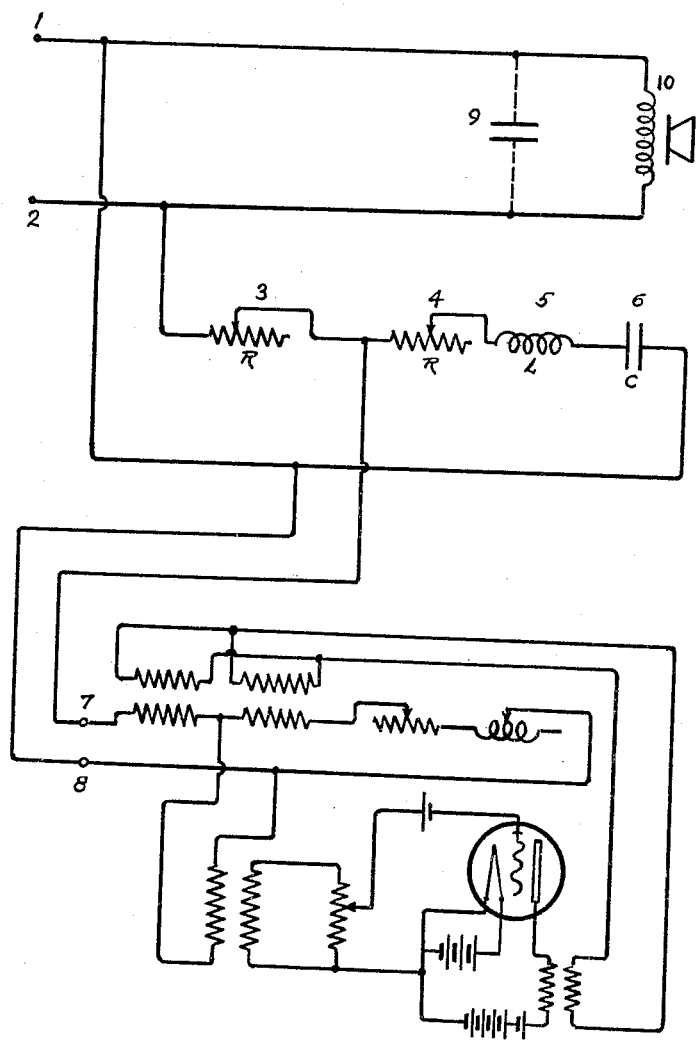

The accompanying drawings illustrate the present invention. Fig. 1 shows, in schematic form the basic idea underlying the present invention, that of a negative anti-resonant circuit; Fig. 2 indicates the usual type of anti-resonant circuit; Fig. 3 indicates in full line the frequency reactance characteristics of the two-terminal network of Fig. 1 of the drawings, and in dotted line the frequency-reactance characteristics of the network shown in Fig. 2 of the drawings; Fig. 4 indicates an arrangement of apparatus which develops the same electrical characteristics as the arrangement shown in Fig. 1 of the drawings. Fig. 5 indicates the actual equipment and apparatus used for realizing in practice the underlying idea of the present invention which is indicated schematically on Fig. 1 of the drawings. Fig. 6 shows a combination of the negative anti-resonant circuit with a natural anti-resonant circuit consisting of the parallel combination of the reactance of audio-receiving equipment 10 with the natural capacity between the terminals of the same receiving equipment which is shown in dotted line, as element 9. The anti-resonant circuit of the present invention and the receiving equipment are connected in parallel, as shown in Fig. 6, to terminals 1 and 2.

This invention will be best understood by reference to my two pending applications— S. N. 374,084 covering a negative capacity (originally filed as S. N. 599,603 on Nov. 7th, 1922) and S. N. 310,395, covering a negative inductance. Since an anti-resonant circuit consists, as shown on Fig. 2 of the drawings, of an inductance and a capacity in parallel, it is possible to obtain a negative anti-resonant circuit using, in parallel to each other, a negative capacity $(-C_1)$ (as outlined in my pending application S. N. 374,084) and a negative inductance $(-L_1)$ as described in pending application S. N. 310,395. This arrangement requires the use of two separate sources of power, two negative resistances marked $(-R)$ on Fig. 4. I have found out, however, that the number of negative resistances required can be reduced from two to one, by using the arrangement shown on Fig. 1 of the drawings, wherein only a single negative resistance source is shown.

To show how it is possible to realize the requirements of a negative anti-resonant circuit, reference may be made to Fig. 1 of the drawings, which shows a negative resistance $(-R)$ in parallel with the series combination of elements $(+R)$, $(L)$ and $(C)$. The joint impedance of these two parallel branches is given by:

$$(-R)\frac{R+j\left(pL-\frac{1}{pC}\right)}{-R+R+j\left(pL-\frac{1}{pC}\right)}$$

After obvious simplifications this impedance may be expressed by $$(1) \quad -R+\frac{jR^2}{pL-\frac{1}{pC}}$$

If, now, as shown on the drawings, I add the positive resistance $(+R)$ to the joint impedance as given by formula (1), I obtain for the impedance of the circuit between terminals (1) and (2)

$$(2) \quad \text{Impedance} = +j\frac{R^2}{pL-\frac{1}{pC}}$$

This impedance is, as shown, in Formula 2 a pure reactance. The susceptance of the circuit is given by, as well known, by the inverse of the reactance, hence it is equal to $$(3) \quad \frac{pL-\frac{1}{pC}}{+jR^2} = -jp\frac{L}{R^2}+j\frac{1}{pCR^2}$$

The first term in the above expression represents a negative capacity, the second term a negative inductance. If, then, I wish to construct a negative anti-resonant consisting of a negative capacity $(-C_1)$ and a negative inductance $(-L_1)$, I choose the element in Fig. 1 of the drawings, as follows:

$$(4) \quad \frac{L}{R^2}=C_1$$

$$(5) \quad CR^2=L_1$$

The given quantities are $(L_1)$ and $(C_1)$, the unknowns are $(L)$, $(C)$ and $(R)$.

The value of the elements L and C are therefore determined once, I fix the value of $(R)$, which I am free to choose as I will. To obtain a negative capacity $(-C)$ I insert an inductance element $L=C_1R^2$ and to obtain the equivalent of a negative inductance $(-L_1)$ in parallel with $(-C_1)$, I insert a capacity element $$C=\frac{L_1}{R^2}$$

in series with element $(L)$. It is interesting to note that to obtain the negative counterpart of a parallel system (Fig. 2), I have to use a series system of reactance elements as shown on Fig. 1.

The preferred arrangement of apparatus required is shown in Fig. 5 of the drawings. The negative resistance element 4 is represented by the equipment connected to terminals 8—9. This equipment is completely described in U. S. A. Patent 1,606,350 granted to me, and for that reason will not be described here.

A very valuable advantage of the arrangement shown on the drawings is the ease with which the constants of the negative anti-resonant circuit may be changed to meet different requirements. By changing the value of element L in Fig. 1 of the drawings, the circuit may be adjusted for a different value of negative capacity without in any way changing the value of the negative inductance. Also, by changing the value of element C in Fig. 1 of the drawings, the circuit may be adjusted for a different value of negative inductance. If, therefore, variable, instead of fixed elements are provided for $(L)$ and $(C)$ in Fig. 1 of the drawings, the same equipment may be used to obtain a variety of negative anti-resonant circuits. It is also possible, of course, to change the constants of the negative anti-resonant circuit by changing all the $(R)$ elements (3 in number) simultaneously by the same amount. However, in such a case, the value of the negative capacity and of the negative inductance cannot be changed independently of each other, since these elements vary inversely with $(R)$, as shown in formulas (4) and (5).

The uses to which a negative anti-resonant circuit may be put are so many that only a few, outstanding in importance and value, need be mentioned. It has, heretofore, never been possible in the art to construct any inductance coils without also developing a capacity effect at the terminals of such a coil. It is, in general, the effect of this capacity that prevents the use of inductance coils as choke coils in high frequency circuits, in any efficient manner. Where such coils are present in signalling lines for operating reasons they tend to introduce "distortion" or "selective" effects at various frequencies. Such distortion interferes with true distortionless transmission. Where necessary to eliminate to effect of such coils in whole or in part, it is necessary to neutralize both the inductive reactance of the coils and their natural bridged capacity. This can be effected simultaneously by means of a negative anti-resonant circuit, as first described in these specifications, to any extent that may be desired. The neutralization of the reactance effect and of the capacity can be made absolute or the two reactance effects, capacity inductance neutralized in different proportions, though still equally effective at all frequencies, substantially as hereinabove described. Another equally important application consists in the possibility the use of the anti-resonant circuit affords to construct an aperiodic antenna. Most antennas have series reactance and bridge capacity to ground, essentially an anti-resonant combination. Ordinary methods of neutralization, through "tuning" out of the series reactance of the antenna result, as well known, in unequal attenuation of the various frequencies in the side bands of a modulated wave received or transmitted through said antenna. This results in "distortion" of the speech transmitted by the side band. A negative anti-resonant circuit, being equally effective at all frequencies, as demonstrated mathematically hereinabove, when used in combination with an antenna does provide the means to attain the highly desirable objective of nearly distortionless transmission of the entire speech side-bands. The great advantage of being able to neutralize simultaneously, and with equal effectiveness at all frequencies, two reactance effects—capacity and inductance reactance wherever found in parallel relation—is clearly evident from the very brief description of two uses just mentioned. A third important application consists in the possibility of neutralizing simultaneously the capacity between turns and the series reactance of the receiver used in either the signalling arts or in the audio receiving equipment in the broadcasting art. All receivers have a bridged capacity effect across their terminals and series reactance in their winding. They are, as well known, responsive in different degrees to different frequencies. A negative anti-resonant circuit, when used in combination with such a receiver, greatly improves the "fidelity" of reproduction of speech by such receivers. In all of the three cases, chosen more or less at random, the electrical representation of the equipment neutralized is that of an electrical net-work having inductive reactance and capacity in parallel. The use of a negative anti-resonant circuit in combination with any such net-work, does result in the extremely valuable advantages hereinabove mentioned.

The desirable objectives above described, can be obtained in two different ways:

(a) By using the negative anti-resonant circuit, illustrated in schematic form on Fig. 1 of the drawings in parallel relation with the anti-resonant circuit to be neutralized. This might be as just stated, a receiver coil winding with bridged natural capacity across its terminal. Such an application is shown, as a combination, in Fig. 6 of the drawings wherein element 10 is the usual type of loud-speaking receiver and element 9, shown in dotted line, represents the inherent capacity of the windings of said receiver.

(b) By using the negative anti-resonant circuit in series relation with the anti-resonant circuit to be neutralized, partially or completely. When the neutralization is complete the combination as a whole represents a pure resistance.

I claim:

1. An automatic device having reactance characteristics exactly opposite and equal to in absolute value to that of a given anti-resonant circuit, for each value of frequency.

2. A two-terminal network consisting in the combination of a negative resistance in parallel with the combination of a resistance, an inductance and a capacity all in series relation, the entire parallel combination being wired in series with a resistance.

3. An automatic device having reactance characteristics exactly opposite and equal to in absolute value to that of a given anti-resonant circuit, for each value of frequency, with additional means to vary the constants of said device.

4. In combination with an electrical network containing an anti-resonant circuit, automatic means for the complete neutralization of the reactance of said anti-resonant circuit, effective for all frequencies.

5. In combination with an electrical network containing an anti-resonant circuit, automatic means for the partial neutralization of the reactance of said anti-resonant circuit, equally effective for all frequencies.

6. In an electrical network, containing an anti-resonant circuit, automatic means for neutralizing the effect of said anti-resonant circuit to the flow of current through said network, such means being equally effective at all frequencies.

In testimony whereof I affix my signature.

MIHRAN M. DOLMAGE.